United States Patent [19]
Kim et al.

[11] Patent Number: 5,581,108
[45] Date of Patent: Dec. 3, 1996

[54] OPTICAL SWITCHING DEVICE

[75] Inventors: Hong-Man Kim; Kwang-Ryong Oh; Ki-Sung Park; Chong-Dae Park, all of Daejeon, Rep. of Korea

[73] Assignee: Electronics & Telecommunications Research Institute, Daejeon-shi, Rep. of Korea

[21] Appl. No.: 301,998

[22] Filed: Sep. 7, 1994

[30] Foreign Application Priority Data

Sep. 9, 1993 [KR] Rep. of Korea ............ 93-18145
Sep. 10, 1993 [KR] Rep. of Korea ............ 93-18267

[51] Int. Cl.$^6$ .................. H01L 31/00; G02B 6/26
[52] U.S. Cl. .................. 257/457; 257/459; 257/466; 385/18; 385/21
[58] Field of Search .................. 257/184, 186, 257/452, 457, 459, 466, 431, 432; 385/16, 17, 18, 20, 21, 8, 9, 129, 130; 372/50

[56] References Cited

FOREIGN PATENT DOCUMENTS 3-278030  12/1991  Japan ............ 385/18

OTHER PUBLICATIONS

Hiroaki Inoue et al., "An 8mm Length Nonblocking 4×4 Optical Switch Array", IEEE J. on Selected Areas in Communications, vol. 6, No. 7, Aug. 1988, pp. 1262–1266.

Kiyohide Wakao et al., "InGaAsP/InP Optical Switches Embedded with Semi–Insulating InP Current Blocking Layers", IEEE J. on Sel. Areas in Comm., vol. 6, No. 7, Aug. 1988, pp. 1199–1204.

K. Ishida et al., "InGaAsP/InP optical Switches Using Carrier Induced Refractive Index Change", Appl. Phy. Lett., vol. 50, pp. 141–143, (1987).

*Primary Examiner*—Minhloan Tran
*Attorney, Agent, or Firm*—Larson and Taylor

[57] ABSTRACT

Disclosed is an optical switch device for totally reflecting an incident light therein in accordance with a change in refractive index occurring owing to current application, which is manufactured by the steps of: sequentially forming an optical waveguide layer, an n-InP clad layer and an n-InGaAs cap layer on a main surface of an n-InP substrate using an epitaxial growing; selectively etching the n-InGaAs cap layer to form an opening tapered downward; diffusing an impurity into the n-InP clad layer through the opening and into the n-InGaAs cap layer to a predetermined depth from a surface thereof so as to form a first impurity diffused region in the n-InP clad layer under the opening and to form a second impurity diffused region along the surface of the n-InGaAs cap layer; etching the layers on the optical waveguide layer using a mask to form a ridge-shaped waveguide; and forming electrodes on the n-InGaAs cap layer and an exposed surface of the n-InP clad layer and on a surface which is opposite to the main surface of the n-InP substrate. Also, before forming the n-InGaAs cap layer, a p-InP current blocking layer is formed between the n-InP clad layer and the n-InGaAs cap layer so as to prevent a current from being dispersed other portions excluding the impurity diffused portion.

3 Claims, 4 Drawing Sheets

OPTICAL SWITCHING DEVICE

BACKGROUND OF THE INVENTION

1. Field of the Invention

The present invention relates to an optical switch device to be used as a primary component in an optical transport system, and more particularly to an optical switch device possible to totally reflect an incident light on an optical waveguide therein in accordance with a change in refractive index occurring owing to current application and a manufacturing method of the same.

2. Description of the Prior Art

Optical switch devices generally are used as principal components of an optical transport system possible to highly increase a transporting capacity of data and an operating speed therein, passing the limit of existing electronic switching systems.

Total reflection type of semiconductor optical switch has an operation characteristic, that, when current is applied to the optical switch, a refractive index of an optical waveguide layer therein is varied, or reduced. In detail, when current is applied to a part of an optical waveguide layer in such an optical switch, a difference of refractive index occurs between the current applied part and another part where current is not applied within the optical waveguide layer, and then a light propagating through the optical waveguide layer is totally reflected on an interface between the two parts in accordance with Snell's law. As a result, the propagating light is switched at the interface in the waveguide layer, and the switched light is propagated along another optical path. In order to obtain a total reflection of light in an optical waveguide, a change in refractive index must satisfy condition of following expression:

$$\Delta n \geq n(1-\cos\theta)$$

where n is refractive index of the waveguide layer, $\Delta n$ is variation of refractive index of the waveguide layer caused due to a current application, and $\theta$ is a reflection angle of an incident light.

In order to manufacture an optical switch device provided with a totally reflecting interface therein, Conventional techniques most widely used presently can be summarized as three methods.

Firstly, one of the techniques is that, after performing crystallization on a semiconductor substrate to form a crystal layer, zinc impurity is partially diffused only into a light reflection surface of the crystal layer, as shown in FIG. 1A. This optical switch device provided with a partially diffused reflection surface is disclosed in "An 8 mm Length Nonblocking 4×4 Optical Switch Array", Areas in Commun., Vol. 6, pp. 1262–1266, 1988.

As shown in FIG. 1A, a first optical waveguide layer 2 is formed on a main surface of a semiconductor substrate 1. On the first optical waveguide layer 2, a clad layer 3 and a second optical waveguide layer 5 are sequentially formed. After zinc impurity is partially diffused into the second optical waveguide layer and the clad layer to form an impurity diffused portion 8, a well-known etching process in the art is performed so as to remove portions of the second optical waveguide layer, the clad layer and the first optical waveguide layer. Then, the first optical waveguide layer is removed to a predetermined depth thereof. Subsequently, a p-type front electrode and a rear electrode are respectively formed on the impurity diffused portion and a rear surface which is opposite to the main surface of the substrate 1. In construction of the optical Switch device manufactured thus, a light reflection surface is formed in the impurity diffused portion 8, as shown in FIG. 1A.

In such an optical switch device that is provided with a reflection surface, it is required that zinc impurity must be diffused into an optical waveguide layer, not exceeding the width of the waveguide. To reduce the width of the waveguide an area of ohmic contact is considerably limited within the optical switch device. Also, since zinc is diffused along a horizontal surface, width of a mask for zinc-diffusing must be considered, or reduced. If zinc has been diffused over a width of the waveguide, a current signal as carrier is dispersed over the waveguide. For this reason, the above-described optical switch device has the drawback that a current signal flowing in an optical waveguide can not be controlled effectively.

In addition, there is a making method of a slit type of optical switch device in which two diffusion steps are performed before crystallization on a semiconductor substrate and after crystallization so as to form an impurity diffused portion therein, as shown in FIG. 1B. The making method of this slit type optical switch device is well disclosed in "Appl. Phys. Lett.", Vol. 50, pp. 141–143, 1987). This slit type of optical switch device is provided to effectively control restraint of a current signal flowing through a waveguide therein.

The same components as those in FIG. 1A are indicated by the same reference numerals.

With reference to FIG. 1B, before formation of crystal on a main surface of a semiconductor, zinc is diffused into the substrate 1 using a mask so as to a first diffused portion 8A. Similarly to create crystallization as shown in FIG. 1A, a first optical waveguide layer 2, a clad layer 3 and a second optical waveguide 5 are sequentially formed on the substrate 1. Subsequently, zinc is diffused into the laminated layers 5 and 3 so as to form a second diffused portion 8B, and a front electrode 6 and a rear electrode 7 are formed on the second diffused portion 8B and a rear surface opposite to the main surface of the substrate 1, respectively. As a result, the slit type optical switch device has a p/n/p/n current blocking layer, and hence restraint of a current signal flowing therein can be effectively controlled.

However, such a slit type of optical switch device has the drawback that a lithographic alignment technique having precision of 1 μm or less is required to fabricate such an optical switch device, and two diffusing steps must be performed under several complicated conditions such as accurate control in quantity of a diffusing material or a precise temperature. Similarly, the slit type of the optical switch device has another drawback that reduction of the width of the waveguide and an area of ohmic contact is significantly limited.

Finally, there is an InGaAsP/InP optical switch device having a semi-insulating InP current blocking layer, as shown in FIG. 1C. This optical switch device is disclosed in "InGaAsP/InP Optical Switches Embedded with Semi-Insulating InP Current Blocking Layers", Sel. Areas in Commun., Vol. 16, pp. 1199–1204, 1988.

The same components as those in FIG. 1B are indicated by the same reference numerals.

As shown in FIG. 1C, on a main surface of a semiconductor substrate 1 a first optical waveguide layer 2 and a current blocking layer 4 are sequentially formed. By an etching process, a portion of the current blocking layer 4 is removed to form an open portion. Subsequently, re-crystallization steps are performed so as to form a clad layer 3' and a second optical waveguide layer 5' in the open portion. A front electrode 6 and a rear electrode 7 are respectively formed on the second optical waveguide layer 5' and a rear surface opposite to the main surface of the substrate 1, respectively.

Because such an InGaAs/InP optical switch device has an InP semi-insulating layer produced by performing crystallization twice, a current flowing therein can be effectively blocked.

However, this optical switch device has the same drawbacks as that of the above-mentioned switches. Also, in the InGaAs/InP optical switch device, since zinc is diffused into the waveguide to form an impurity diffused portion and a front electrode 6 is formed only on the diffused portion, a contact area between the diffused portion and the front electrode 6 is considerably limited and hence ohmic characteristic is lowered. As a result, a high current signal of 90 mA or more is required to execute a switching operation in this InGaAs/InP optical switch device, and thereby current consumption is further increased in quantity.

SUMMARY OF THE INVENTION

It is one of objects of the present invention to provide an optical switching device and a manufacturing method of the same in which a contact area between a front electrode and an impurity diffused portion is maximized so as to improve ohmic characteristic thereof.

It is the other object of the present invention to provide an optical switching device and a manufacturing method of the same in which restraint of a current signal flowing therein can be effectively controlled and thereby current consumption required for switching operation can be minimized.

According to one aspect of the present invention, the optical switch device comprises an n-InP substrate;. an optical waveguide layer formed on a main surface of the n-InP substrate; an n-InP clad layer formed on the optical waveguide layer; an n-InGaAs cap layer formed on the n-InP clad layer, said cap layer having an opening which is tapered downwardly; an impurity diffused portion where a p type impurity having a high concentration is injected into the n-InP clad layer through the opening and into the n-InGaAs cap layer to a predetermined depth from a surface thereof; a front electrode formed on the n-InGaAs cap layer and an exposed surface of the n-InP clad layer; and a rear electrode formed on a surface which is opposite to the main surface of the n-InP substrate.

In this embodiment, the optical switch device further comprises a p-InP current blocking layer formed between the n-InP clad layer and the n-InGaAs cap layer so as to prevent a current from being dispersed other portions excluding the impurity diffused portion.

According to another aspect of the present invention, the manufacturing method of the optical switch device comprises the steps of: sequentially forming an optical waveguide layer, an n-InP clad layer and an n-InGaAs cap layer on a main surface of an n-InP substrate using an epitaxial growing; selectively etching the n-InGaAs cap layer to form an opening tapered downward; diffusing an impurity into the n-InP clad layer through the opening and into the n-InGaAs cap layer to a predetermined depth from a surface thereof so as to form a first impurity diffused region in the n-InP clad layer under the opening and to form a second impurity diffused region along the surface of the n-InGaAs cap layer; etching the layers on the optical waveguide layer using a mask to form a ridge-shaped waveguide; and forming electrodes on the n-InGaAs cap layer and an exposed surface of the n-InP clad layer and on a surface which is opposite to the main surface of the n-InP substrate.

In this embodiment, the method further comprises, before forming the n-InGaAs cap layer, a step of forming a p-InP current blocking layer formed between the n-InP clad layer and the n-InGaAs cap layer so as to prevent a current from being dispersed other portions excluding the impurity diffused portion.

BRIEF DESCRIPTION OF THE DRAWINGS

This invention may be better understood and its object and advantage will become apparent to those skilled in the art by reference the accompanying drawings as follows.

DESCRIPTION OF THE PREFERRED EMBODIMENT(S)

Figure 1A:
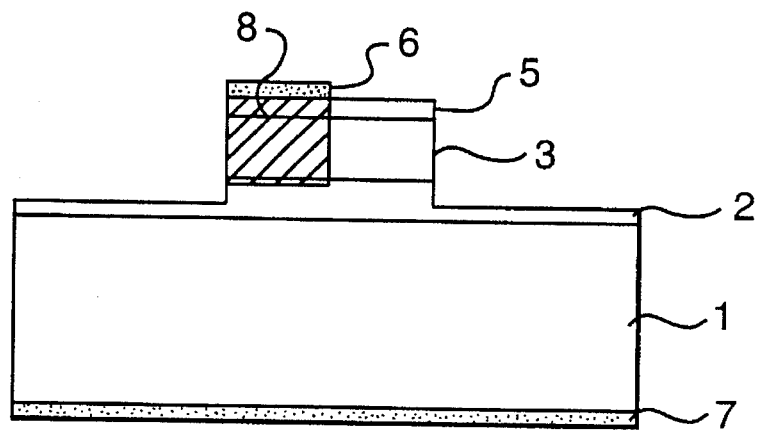
FIGS. 1 to 1C are cross-sectional views showing constructions of several optical switches as prior arts.
Figure 1B:
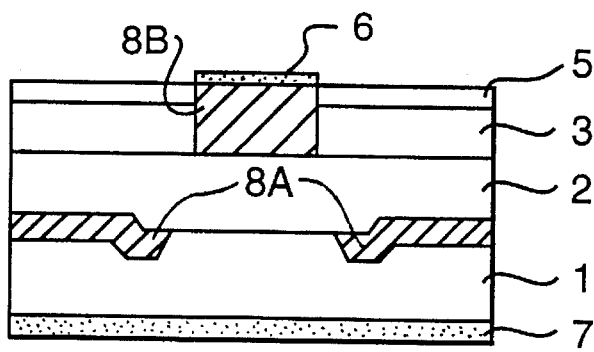
Figure 1C:
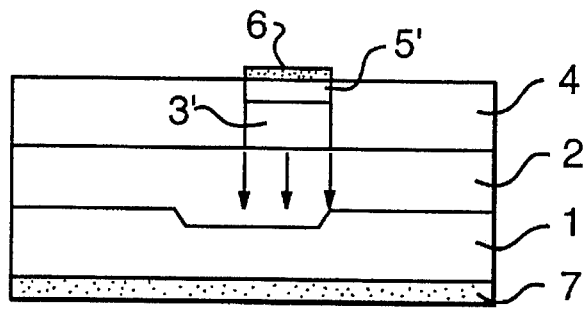
Figure 2:
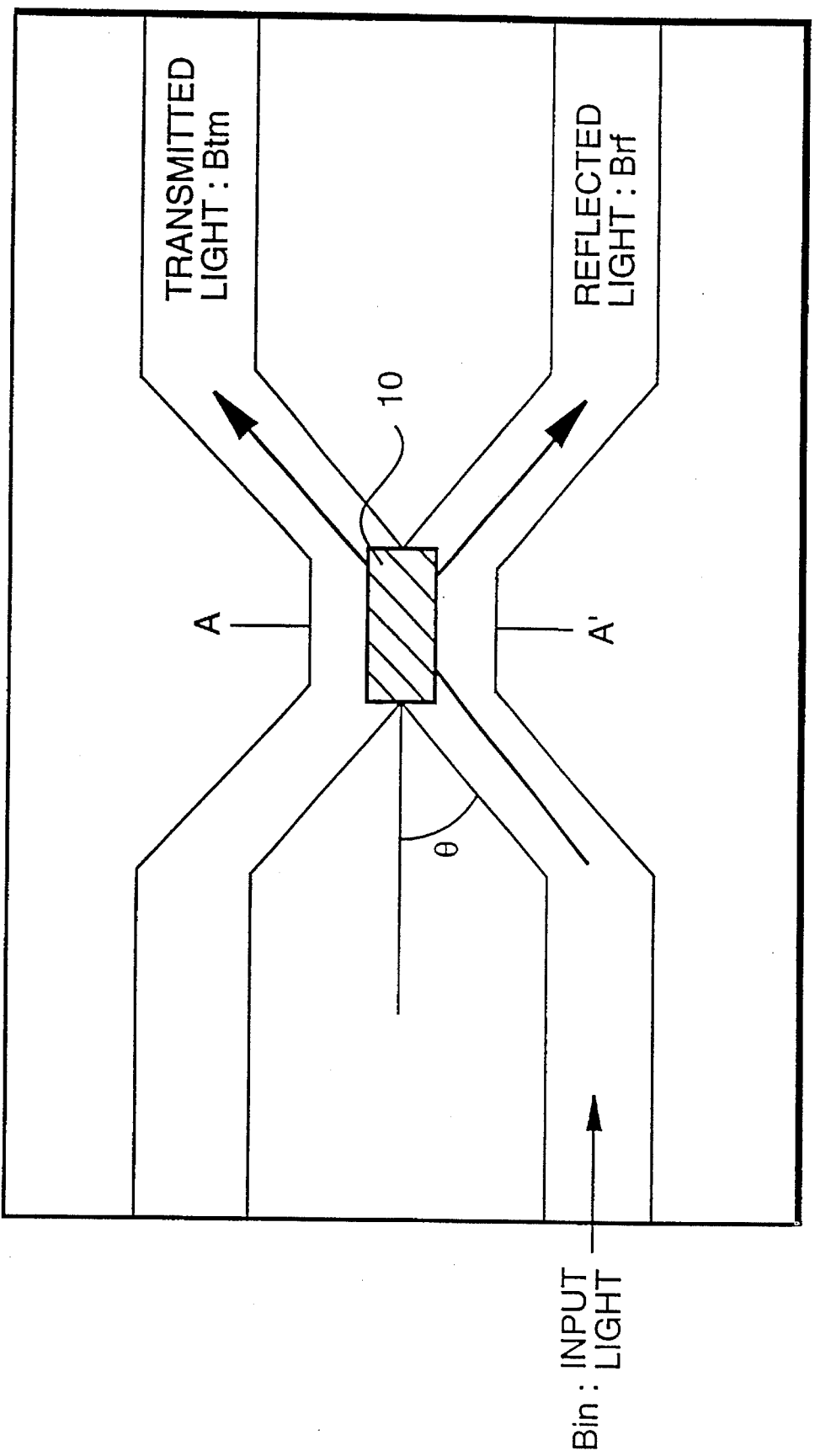
FIG. 2 is a plane view of an optical switching system in which an optical switch device according to the present invention is embodied.

Referring to FIG. 2, it is shown that the optical switch device of the present invention is embodied in an optical switching system. Reference numeral 10 is an optical switch device which is manufactured by the present invention.

Optical waveguide in the optical switching system has a cross-shaped construction, as shown in FIG. 2. The optical switch device 10 is established at a crossing of the optical waveguide. An input light $B_{in}$ from an input port of the optical waveguide is transmitted toward the optical switch device 10. Then, the input light $B_{in}$ is outputted as a transmitted light $B_{tm}$ or a reflected light $B_{rf}$ in accordance with operation state of the optical switch device 10.

Figure 3A:
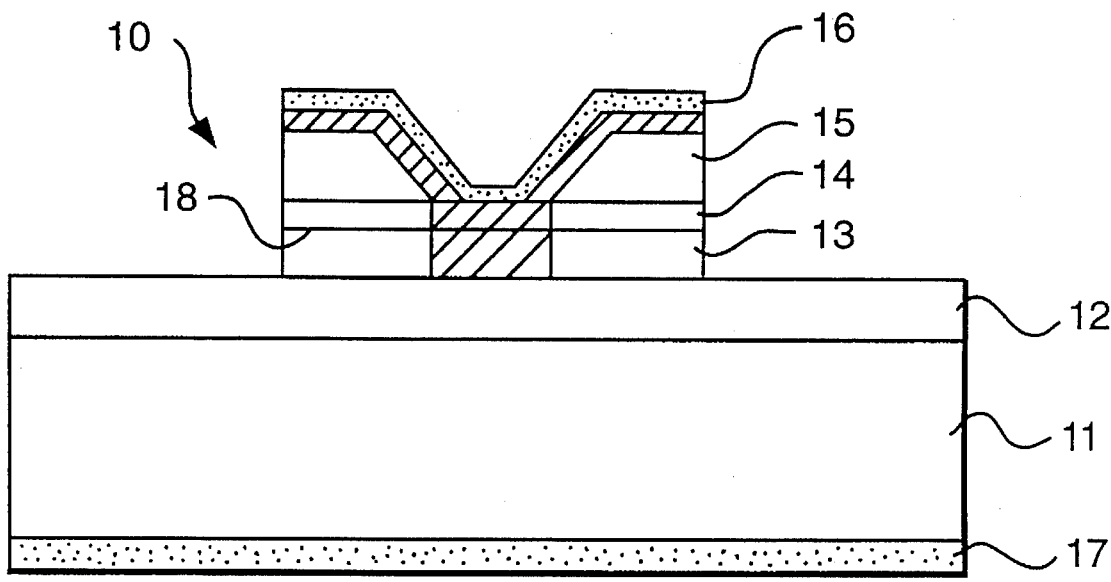
FIG. 3A is a cross-sectional view taken along line A—A of FIG. 2 showing the construction of an optical switch device manufactured in accordance with an embodiment of the present invention.

FIG. 3A is a cross-sectional view taken along the line A—A' of FIG. 2 and shows the construction of the optical switch device 10.

With reference to FIG. 3A, on a main surface of an n-InP substrate 11, an optical waveguide layer 12 and an n-InP clad layer 13 are sequentially grown by crystallization and thereby a ridge shape is formed on the substrate 11. On the clad layer 13, a p-InP current blocking layer 14 and an n-InGaAs cap layer 15 are formed in order. This n-InGaAs cap layer 15 has an opening which is tapered downward. An impurity having a high concentration is diffused into the current blocking layer 14 and the clad layer 13 through the opening, and then into the cap layer 15 to a predetermined depth from a surface thereof. As a result, an impurity diffused portion 18 is formed in the current blocking layer 14 and the clad layer 13 laminated with each other, and formed along the surface of the cap layer 15.

By final fabrication, a front electrode 16 is formed on the n-InGaAs cap layer 15 and an exposed surface of the p-InP current blocking layer 14. On a surface of the substrate 11 which is opposite to the main surface thereof, a rear electrode 17 is formed.

Since the n-InGaAs cap layer 15 in the optical switch device 10 is provided with the downward tapered opening, the cap layer 15 has a maximum area to apply a current to a light reflecting surface, which is formed as a bottom surface of the impurity diffused portion and provided at a crossing of the optical waveguide in the optical switch device 10. Therefore, width of the impurity diffused portion 18 as a current application region can be designed without a restraint, because of the above-mentioned, downward tapered opening.

In addition, an interface area contacted between the impurity diffused portion 18 and the front electrode 16 is relatively wide, as compared to that of a conventional optical switch device, and therefore an ohmic characteristic can be considerably improved.

Also, because the current blocking layer 14 is used in this embodiment, a current signal can be prevented from being dispersed into other regions excluding the impurity diffused portion.

On the other hand, in the optical switching system shown in FIG. 2, an input light $B_{in}$ is introduced through an input port and is propagated along the optical waveguide layer 12. Then, when a voltage signal is not applied to the electrodes 17 and 18 and thereby a current signal does not flow in the vicinity of the crossing of the optical waveguide layer 12, a change in a refractive index does not occur in the optical waveguide layer 12. As a result, the input light $B_{in}$ passes through the crossing of the optical waveguide layer 12 and is outputted as a transmitted light $B_{tm}$.

However, when a voltage signal is applied to the electrodes 17 and 18, a current signal flows in the vicinity of the crossing of the optical waveguide layer 12. Then, carriers of the current signal are aggregated in the vicinity of the optical waveguide layer 12, and thereby a refractive index is reduced in the optical waveguide layer 12. If the reduced refractive index satisfies total reflection of Snell's law, the input light $B_{in}$ is switched and outputted as a reflected light $B_{rf}$.

Figure 3B:
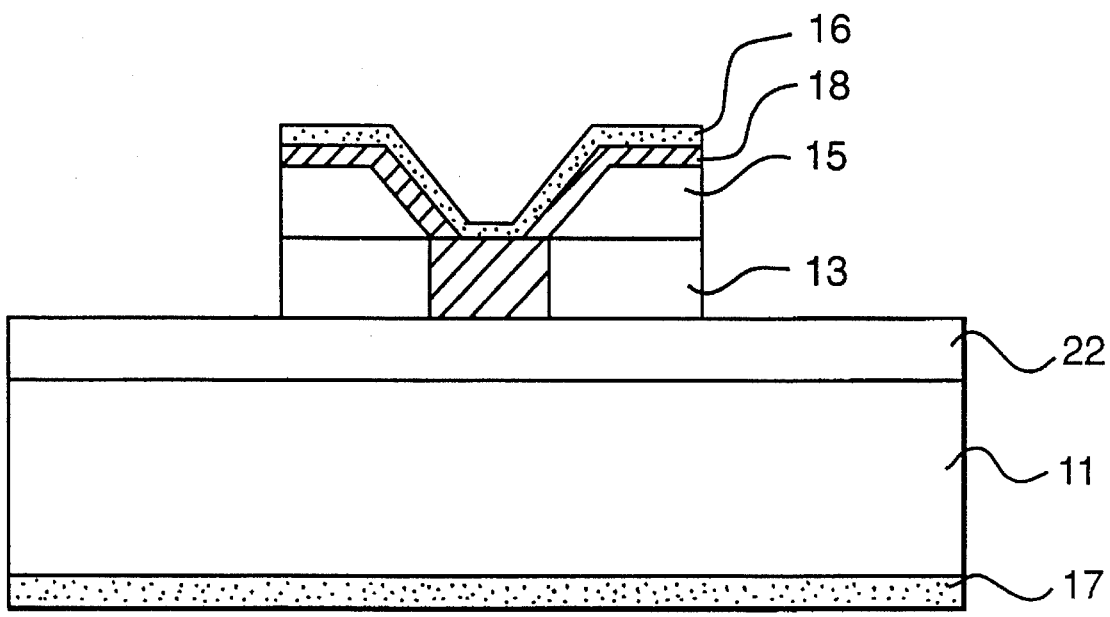
FIG. 3B is a cross-sectional view showing another construction of the optical switch device manufactured in accordance with another embodiment of the present invention.

FIG. 3B is a cross-sectional view showing another optical switch device of the present invention.

The optical switch device of FIG. 3B has the same construction as that of FIG. 3A except that the optical waveguide layer is formed of p-InGaAs layer 22 and the n-InGaAs cap layer 15 is formed directly on the n-InP clad layer 13 without formation of the p-InP current blocking layer 14. Component elements having similar functions to the component elements of the optical switch device of the first embodiment(shown in FIG. 3A) are indicated by the same reference numerals, and descriptions thereof are omitted. The optical switch device of FIG. 3B has similar effects to the device of FIG. 3A.

A manufacturing method of the optical switch device of FIG. 3A will be described in detail with reference to FIGS. 4A to 4E.

Figure 4A:
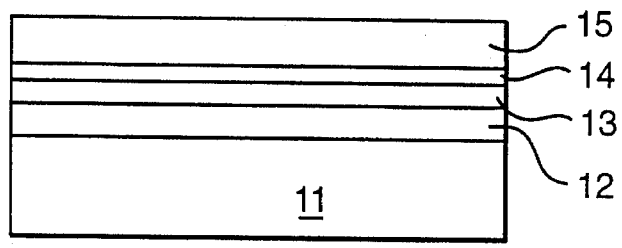
FIGS. 4A to 4E are cross-sectional views showing the manufacturing steps of the optical switch device of FIG. 3A.

Referring to FIG. 4A, on an n-InP substrate 11, an n-InGaAs optical waveguide layer 12, an n-InP clad layer 13, a p-InP current blocking layer 14 and an n-InGaAs cap layer 15 are sequentially grown by an epitaxial growing method of MOCVD (metal organic chemical vapor deposition) or LPE (liquid phase epitaxy).

Figure 4B:
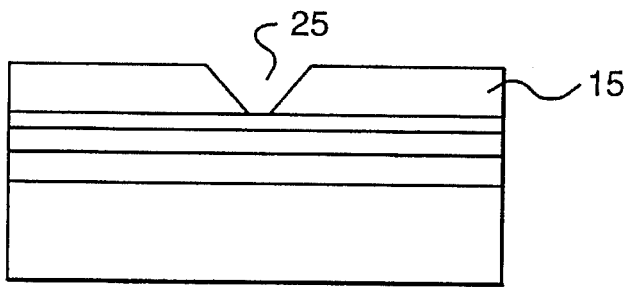

In FIG. 4B, it is shown that an opening 25 is formed in the n-InGaAs cap layer 15. For example, the cap layer 15 is selectively etched to form the opening 25. This opening 25 has a downward tapered shape, because an anisotropic etching method is performed as the selectively etching method. The opening 25 is formed above a light reflecting surface to be described hereinafter.

Figure 4C:
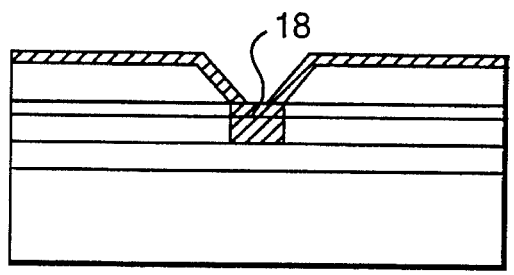

As shown in FIG. 4C, in order to form an impurity diffused portion, a diffusing step is performed. A zinc impurity having a high concentration is diffused into the current blocking layer 14 and the clad layer 13 through the opening 25, and at the same time into the cap layer 15 to a predetermined depth from a surface thereof. As a result, an impurity diffused portion 18 is formed in the current blocking layer 14 and the clad layer 13 laminated with each other, and formed along the surface of the cap layer 15. Since a current diffusion coefficient of an InP material is far greater than that of an InGaAs material, a current blocking region having a p/n/p/n structure can be readily formed in the vicinity of the impurity diffused portion 18. Hereinafter, in the impurity diffused portion 18, a region formed under the opening 25 is called a first impurity diffused region and another region formed along the surface of the n-InGaAs cap layer 15 is called a second impurity diffused region. Since the cap layer of the optical switch device is formed of an n-InGaAs layer, sulfuric acid solution or phosphoric acid solution can be used as a selectively etching solution and hence the etching step can be easily performed.

Figure 4D:
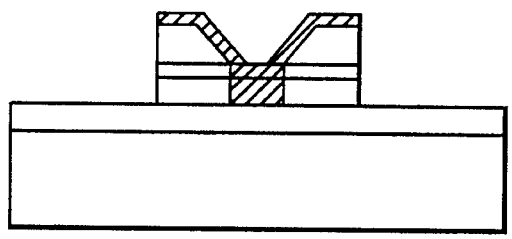

With reference to FIG. 4D, to form a waveguide of a ridge shape, an etching step is performed. By performing a wet etching or a dry etching, the layers laminated on the optical waveguide layer 12 are removed using a mask to form a ridge shape.

Figure 4E:
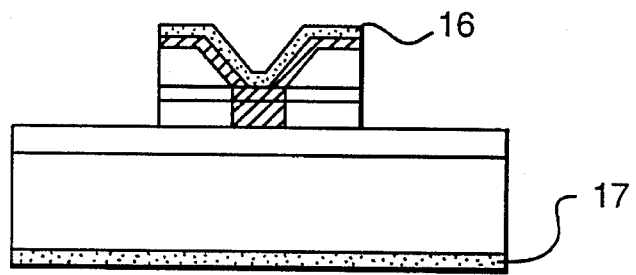

Finally, steps for forming electrodes are performed. As shown in FIG. 4E, a front electrode 16 is formed on the n-InGaAs cap layer 15 and an exposed surface of the p-InP current blocking layer 14. Also, on a surface of the substrate 11 which is opposite to the main surface thereof, a rear electrode 17 is formed. At a result, fabrication of the optical switch device 10 is completed.

As shown in FIG. 4E, the front electrode 16 is considerable wide as compared to the bottom surface (i.e. a light reflecting surface) of the impurity diffused portion 18, and therefore a contact resistance between the front electrode 16 and the first impurity diffused region can be reduced.

A p/n/p/n junction structure also is formed at the both sides of the first impurity diffused region, whereby a current flowing to the junction structure is blocked. At a result, a current signal is effectively injected into the light reflecting surface of the impurity diffused portion 18.

In addition, the manufacturing method of the optical switch device of FIG. 3B is the same as that of the optical switch device of FIG. 3A except that a p-InGaAs layer 22 is formed on the n-InP substrate 11 as an optical waveguide layer and the n-InGaAs cap layer 15 is formed directly on the n-InP clad layer 13 without formation of the p-InP current blocking layer 14.

As described above, the optical switch device according to the present invention can have a good ohmic characteristic, because a front electrode contacted with an impurity diffused portion is considerably wide as compared to a light reflecting surface of the impurity diffused portion.

Also, since an n-InGaAs cap layer of the optical switch device has a concave-shaped opening which is tapered downward, and a p/n/p/n junction structure is formed at both sides of the impurity diffused portion, a current can be effectively blocked in the device and the device can be operated at low current level.

In addition, since the cap layer of the optical switch device is formed of an n-InGaAs layer, sulfuric acid solution or phosphoric acid solution can be used as a selectively etching solution and hence the etching process can be easily performed.

Moreover, the p/n/p/n junction structure using as a current blocking layer can easily be formed because coefficients of InGaAs and InP materials are different from each other.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An optical switch device for totally reflecting an incident light therein in accordance with a changed refractive index resulting from a supplied current, said optical switch device comprising:

an n-InP substrate;

an optical waveguide layer formed on a region of a main surface of the n-InP substrate;

an n-InP clad layer formed on a region of the optical Waveguide layer:

an n-InGaAs cap layer formed on the n-InP clad layer, said cap layer having a planar surface portion and an opening in said planar surface portion, said opening being tapered in a downward direction toward said substrate and defined by a surface;

an impurity diffusion region formed in at least part of said planar surface portion of said cap layer surrounding said opening, in said opening surface and in said n-InP clad layer below said opening, said diffusion region having a p-type impurity therein;

a front electrode formed on the impurity diffusion region;

a rear electrode formed on a surface which is opposite to the main surface of the n-InP substrate.

2. The optical switch device according to claim 1, and further comprising a p-InP current blocking layer which is formed between the n-InP clad layer and the n-InGaAs cap layer.

3. The optical switch device according to claim 1 wherein said p-type impurity is provided by an injection method.

* * * * *